Feb. 1, 1966  G. F. CROESSANT  3,232,163
PLASTIC SCREW ANCHOR
Filed May 16, 1963

INVENTOR.
George Frederick Croessant
BY
his ATTORNEY

United States Patent Office 3,232,163
Patented Feb. 1, 1966

3,232,163
PLASTIC SCREW ANCHOR
George Frederick Croessant, Reading, Pa., assignor, by mesne assignments, to United Shoe Machinery Corporation, a corporation of New Jersey
Filed May 16, 1963, Ser. No. 280,862
1 Claim. (Cl. 85—83)

This invention relates to a plastic screw anchor which is particularly suitable for anchoring onto solid walls.

In the past, solid wall anchors have been used comprising essentially portions which are expandable upon screwing into the anchor a wedging wood screw to effect such expansion. However such anchors have had the outstanding disadvantage of being relatively weak because of strength limitations of plastic—also in not being able to be firmly anchored into the hole formed in a solid wall.

An object of the present invention is to provide a novel plastic screw anchor especially suitable for insertion in holes formed in solid walls and which is devoid of the above-named disadvantages.

A more specific object of the invention is to provide a novel plastic screw anchor made essentially of toothed expandable halves which are expanded as a consequence of wedging action caused by the screwing therein of a screw, but which anchor is extremely strong and durable and may be securely anchored so as to carry weights considerably larger than ever before for a plastic anchor of the same size.

Other objects and advantages will become more apparent from a study of the following description taken with the accompanying drawing wherein.

Figure 3:
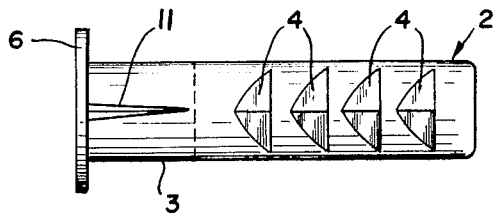
FIG. 3 is a side or plan view as viewed from the top of FIG. 1.

Referring more particularly to the drawing, numeral 2 generally denotes a screw anchor of strong plastic material, such as nylon, or nylon impregnated or reinforced with fibrous material, such as glass fibers either random oriented or woven. Of course, other strong plastic material may be used instead. The screw anchor comprises a cylindrical collar portion 3 and an integral split shank portion which is notched at 4 to provide a series of teeth of somewhat triangular outline, as illustrated in FIG. 3. It is preferred to have the two small flat triangular surfaces forming each tooth disposed at a slight angle to a tangent line, that is, of the order of 10°, as shown more clearly in FIGS. 2 and 3. This provides a central edge that is useful to assist in anchoring to the inner surface of the hole formed in the wall into which the shank and collar portions of the screw anchor are projected. Any suitable number of teeth may be formed in each of the two halves which are separated by the diametrically extending groove 5 which terminates at the collar portion.

Figure 4:
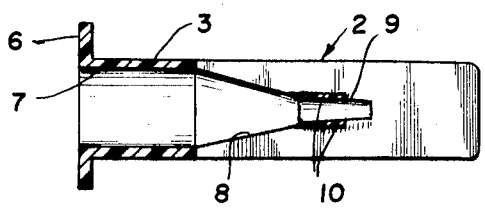
FIG. 4 is a longitudinal, cross-sectional view taken along lines 4—4 of FIG. 1.

Integrally formed on the end of the collar portion 3 is an annular portion 6 whose central opening or surface 7 coincides with that of the collar portion. At the end of such opening as shown in FIG. 4 there is a tapered opening 8 of somewhat funnel shape and disposed at an angle of about 10° with respect to the longitudinal central axis to provide wedging surfaces for the end of a screw (not shown) which is screwed into and threaded to the inner surfaces of opening 8. A wood type screw may be used, preferably of the self tapping type—that is, with a pointed end so as to form its own threads in surfaces 7 and 8. As the pointed end is screwed through surface 8, it will effect a wedging action and separation of the two toothed halves of the shank which are thus expanded against the inner surface of the hole formed in the wall.

Figures 1, 2:
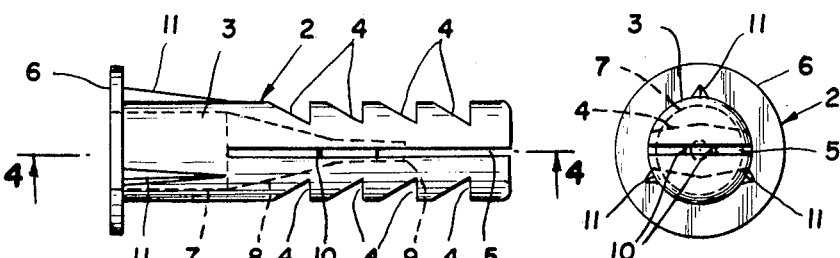
FIG. 1 is a side view of a plastic screw anchor embodying the present invention.
FIG. 2 is an end view taken at the right of FIG. 1.

In order to prevent rotation of the anchor while the screw is turned, ribs 11 are provided which are disposed at an angle of about 5° with respect to the surface of collar 3 and which are preferably centrally edged, as shown in FIGS. 2 and 3, by flat surfaces converging at an outer edge at an angle of about 60°.

The funnel shape surfaces 8 terminate in slightly tapered surfaces 9 disposed at an angle of about 4° with respect to a central longitudinal axis. It is preferred, but not essential, to provide two very thin webs 10 which bridge slot 5 and integrally secure together the two split halves of the shank of the anchor. This prevents accidental spreading of the anchor halves which detracts from the appearance, and yet which does not prevent the two halves from collapsing together as the anchor is inserted in the hole, since web 10 is very fragile and will easily crush on such occurrence.

In operation, a hole is drilled in any solid wall, such as a cement basement floor or sidewall, or perhaps a ceiling of solid material, such as wood. The hole is slightly larger than the outside diameter of collar portion 3 and is of greater length than the distance between ring 6 and the end of the anchor. A self tapping screw of the pointed type, or perhaps even a screw of the machine screw type is screw threaded into and forms threads in surfaces 7 and 8, in succession, thereby spreading apart the two halves of the shank of the anchor and breaking the joining web portion 10. In so doing, the toothed portions will become wedged into the inner surface of the hole formed in the wall and, together with the wedging effect of ribs 11, will prevent rotation of the anchor as a consequence of turning of the screw. The screw may then be unscrewed and then projected through a hole of an object to be supported on the wall, and again re-threaded to the anchor, in a well known manner.

Thus it will be seen that I have provided an efficient, relatively simple and inexpensive plastic screw anchor which is especially adapted for anchoring to solid walls, such as in floors, sidewalls and ceilings, and which has amazing load-carrying characteristics such as not heretofore realized and which provides assured anchoring without any possibility of turning or loosening from the wall so as to have a considerably longer life than heretofore obtained by plastic anchors of comparable size.

While I have illustrated and described a single specific embodiment of my invention, it will be understood that this is by way of illustration only, and that various changes and modifications may be made within the contemplation of my invention and within the scope of the following claim.

I claim:

A plastic screw anchor having a cylindrical collar portion terminating at one end in an annular portion of greater diameter, tapered ribs on the outside of said annular portion integral with said collar portion to prevent turning of said anchor, a split shank portion integrally extending from said collar portion, a plurality of teeth formed on each half of the shank, each of said teeth being of substantially triangular outline and formed of two smaller flat triangular surfaces disposed at an angle of the order of 10° separated by a central edge extending longitudinally to assist in anchoring to the inner surface of the hole formed in the wall into which said shank and collar portions are projected, and a tapered, funnel-like hole extending through said collar portion and into said shank portion, said teeth including an arcuate surface generally perpendicular to the axis of said hole in said shank portion, said flat triangular surfaces being inclined outwardly from the inner end of said arcuate surface toward said annular portion of said collar portion and merging at the apex with the outer surface of the anchor.

References Cited by the Examiner

UNITED STATES PATENTS

| | | | |
|---|---|---|---|
| 2,561,433 | 7/1951 | Uhle | 85—84 |
| 2,843,861 | 7/1958 | Gandy | 85—84 |
| 3,094,892 | 6/1963 | Topf | 85—72 |
| 3,171,321 | 3/1965 | Fischer | 85—83 |

FOREIGN PATENTS

| | | |
|---|---|---|
| 236,042 | 5/1960 | Australia. |

EDWARD C. ALLEN, *Primary Examiner.*